(12) United States Patent
Grabau

(10) Patent No.: US 8,839,733 B2
(45) Date of Patent: Sep. 23, 2014

(54) SEABORNE TRANSPORTATION OF WIND TURBINE BLADES

(75) Inventor: Peter Grabau, Kolding (DK)

(73) Assignee: LM Glasfiber A/S, Kolding (DK)

( * ) Notice: Subject to any disclaimer, the term of this patent is extended or adjusted under 35 U.S.C. 154(b) by 1085 days.

(21) Appl. No.: 12/742,181

(22) PCT Filed: Nov. 3, 2008

(86) PCT No.: PCT/DK2008/000390
§ 371 (c)(1),
(2), (4) Date: Dec. 15, 2010

(87) PCT Pub. No.: WO2009/068031
PCT Pub. Date: Jun. 4, 2009

(65) Prior Publication Data
US 2011/0094428 A1 Apr. 28, 2011

(30) Foreign Application Priority Data
Nov. 27, 2007 (EP) ..................... 07388086

(51) Int. Cl.
B63B 21/56 (2006.01)
F03D 1/06 (2006.01)
F03D 11/04 (2006.01)
B63B 35/00 (2006.01)
B63B 9/06 (2006.01)
F03D 1/00 (2006.01)

(52) U.S. Cl.
CPC . B63B 9/065 (2013.01); F03D 1/06 (2013.01); B63B 35/003 (2013.01); F03D 1/005 (2013.01); F16C 2360/31 (2013.01); F03D 11/04 (2013.01); Y02E 10/721 (2013.01); Y02E 10/727 (2013.01); F05B 2240/95 (2013.01); B63B 21/56 (2013.01)
USPC .......................... 114/242; 114/253; 405/195.1

(58) Field of Classification Search
USPC ............... 114/242–246, 253, 254; 405/195.1, 405/203–209; 416/223 R, 232
See application file for complete search history.

(56) References Cited

U.S. PATENT DOCUMENTS

| | | | |
|---|---|---|---|
| 8,169,099 B2 * | 5/2012 | Roznitsky et al. | 290/44 |
| 2004/0206594 A1 | 10/2004 | Miller | |
| 2005/0206168 A1 * | 9/2005 | Murakami et al. | 290/55 |
| 2006/0280614 A1 | 12/2006 | Quell et al. | |
| 2010/0150665 A1 * | 6/2010 | Karal | 405/232 |

FOREIGN PATENT DOCUMENTS

| | | | |
|---|---|---|---|
| DE | 19621485 | 3/1998 | |
| EP | 1469198 A1 | 10/2004 | |
| FR | 2887900 A1 * | 1/2007 | E02B 17/02 |
| GB | 2344843 A * | 6/2000 | E02B 17/02 |
| WO | WO 02052150 A1 * | 7/2002 | F03D 11/04 |
| WO | WO 03004869 A1 * | 1/2003 | F03D 11/04 |
| WO | 2005035978 A1 | 4/2005 | |
| WO | 2007122376 | 11/2007 | |

* cited by examiner

*Primary Examiner* — Ajay Vasudeva
(74) *Attorney, Agent, or Firm* — Nath, Goldberg & Meyer; Jerald L. Meyer; Sanajana Mangalagiri

(57) ABSTRACT

The present invention relates to a method for transporting a blade for a wind turbine, comprising the steps of lowering said wind turbine blade into water, whereby it floats, and transporting said blade in the water. The invention further relates to a wind turbine blade with its holes sealed, making the blade transportable by floating, and a blade comprising a keel, propeller and a rudder.

10 Claims, 4 Drawing Sheets

SEABORNE TRANSPORTATION OF WIND TURBINE BLADES

CROSS REFERENCE TO PRIOR APPLICATIONS

This is a U.S. National Phase application under 35 U.S.C. §371 of International Patent Application No. PCT/DK2008/000390, filed Nov. 3, 2008, and claims the priority of European Patent Application No. 07388086.6, filed Nov. 27, 2007 both of which are incorporated by reference herein. The International Application published in English on Jun. 4, 2009 as WO 2009/068031 under PCT Article 21(2).

FIELD OF THE INVENTION

The present invention relates to transportation of blades for wind turbines.

The transportation of blades for wind turbines has become more difficult due to, among others, the continuous increase of the blade length, and thereby also increased weight. Transportation along roads is therefore characterized by very long vehicles, typically escorted by service cars and often directed to drive at night in order not to disturb the daily traffic. The dimensions (road width, space in tunnels and on bridges, etc.) of the road is, however, not compatible with the increasing dimensions of the wind turbine blades. As a consequence, some blades are manufactured in several parts that can be assembled later, which is an economically costly solution and technologically undesirable. The latter due to the rendez vous of high loads in the assembly points of such blades.

Due to the geographically widespread use of wind turbines, there are often long distances between the place of manufacture and the location where the wind turbines are installed. Seaborne transportation of wind turbine blades constitutes a widely used transportation means in bringing finished blades to their final destination or part of the way thereto. This seaborne carriage is, however, encumbered with a number of problems and high associated costs. The problems arise as a combination of the twists that ships make at sea and due to the geometrical characteristics of the blades. Hence, the blades can have a length of up to 60 meters or even longer, and are typically both slightly curved and twisted along a longitudinal axis. With such a span of length, the twists of the ship can seriously damage the blades, resulting in costly repair work. In order to compensate for the ships' twists and reduce the damages to the blades, special fixtures are used. These fixtures are customized and thereby unique for every blade type, for which reason every new type of blade requires new and different fixtures. Furthermore, the curvature of the blades makes them difficult to stack in a cost efficient manner. Typically, the fixtures are welded onto the deck of the ship and designed in a way enabling a stacking of the blades in three to four layers. Due to the customization of the fixtures and the elaborate procedures encumbered therewith, seaborne carriage of wind turbine blades is associated with high costs.

However, with a world wide growing market for wind turbines installed both onshore and offshore, there is a huge demand for transportation of wind turbine blades.

OBJECT AND SUMMARY OF THE INVENTION

The objective of the present invention is to propose methods for transporting wind turbine blades. Furthermore, it is an object of this invention to eliminate or at least diminish the above mentioned problems by providing a low-cost, simple, and highly efficient way of transporting wind turbine blades.

According to one aspect the present invention relates to a method for transporting a blade for a wind turbine, comprising the steps of lowering said wind turbine blade into water, whereby it floats, and transporting said blade in the water. The proposed method is advantageous by providing a simple, inexpensive and fast way of transporting wind turbine blades, as the blades are simply lowered in water without, in the simplest case, any further arrangements. The blades can be transported alone or in groups. Furthermore, the transportation of the blades can constitute just a part of the way from the manufacturing site to the installation site, whereas wind turbine blades for both onshore and offshore installations can be transported in this way. Blades for offshore wind turbines can also be transported directly to the installation location, even if this is in areas with a low water level. By having the blades transported directly to each offshore wind turbine, several steps in the process of erecting these wind turbines can be eliminated. For example the crane lifting the blades when mounting these can be positioned in proximity of the erected tower and nacelle. Each time a blade has been mounted, the next blade can simply be moved into the lifting-range of the crane. Therefore the crane does not have to move back and forth between the ship carrying the blades and the location of the offshore wind turbine.

The blades for an offshore wind turbine can also be mounted by the use of a lifting device placed in the hub, wired to the blade root. By means of the wires the blade is simply hoisted to the hub bearing and fastened thereto. Thus there is no need for cranes. Offshore wind turbines are most often placed in water depths of 10-15 m. Therefore, during this hoisting movement of an offshore blade, the tip of the blade will eventually hit the seabed. In order to avoid this potentially damaging impact, the outermost part of the blade can be supported by a rubber boat or other supporting means. In the case of an onshore wind turbine, the blade can be hoisted in a similar way and the blade tip supported by a truck, trailer or other means.

Another advantage is that there are no limitations on the length or weight of the wind turbine blades. Moreover, this kind of transportation does not disturb road users and requires no special and expensive fixtures as with the present seaborne carriage. In continuation of this, many of the elaborate working procedures can also be eliminated. The invention is further advantageous providing transportation where the blade is free to flex and deform without the risk of damage. From the range of advantages listed above it is clear that this method for transporting wind turbine blades in water is inexpensive and thereby a low cost alternative compared to the possibilities known in the state of the art.

In an embodiment said method comprises sealing at least one opening in said wind turbine blade such as a opening in the root end of the wind turbine or drain holes along the wind turbine blade in a watertight way, such that said wind turbine blade can be transported floating in water and where said at least one opening can be at least partly restored after transportation.

In an embodiment said method comprises towing at least one wind turbine blade by a vessel, such as a towboat. This is advantageous as one or a plurality of blades can be transported over long distances.

In an embodiment said method comprises transporting a plurality of wind turbine blades in water in single file behind a vessel. This particular way of transporting is advantageous in narrow or low waters such as a rivers and canals.

In a further embodiment said method comprises transporting a plurality of wind turbine blades in water side-by-side behind a vessel.

In an embodiment said method comprises fastening at least one stabilizing unit to said blade. This is advantageous when the blades are transported through e.g. troubled water.

In an embodiment said method comprises fastening at least one propelling means to said blade. Hereby a very flexible transportation of a blade is obtained providing great maneuverability.

In an embodiment said method comprises fastening at least one towing means to said blade.

In an embodiment said method comprises fastening at least one protecting unit, such as a fender, to said blade. This is particular advantageous as it prevents damages caused by blades hitting each other, by other ships, by floating material, etc.

In a further embodiment the present invention relates to a wind turbine blade for a wind turbine, wherein at least one opening in said wind turbine blade such as a opening in the root end of the wind turbine blade or drain holes along the wind turbine blade has been sealed in a watertight way, such that said wind turbine blade can be transported floating in water and where said at least one opening is at least partly restored after transportation. Hereby it is obtained that the inside of the blade, possibly containing sensitive equipment, is protected.

In an embodiment said wind turbine blade comprises at least one keel detachably fastened to said wind turbine blade. This is advantageous as it stabilizes the blade in the water.

In an embodiment said wind turbine blade comprises at least one stabilizer unit detachably fastened to said wind turbine blade. This is also advantageous as it stabilizes the blade in the water.

In yet a further embodiment said wind turbine blade comprises at least one detachable propelling means. Hereby a very flexible transportation of a blade is obtained, providing great maneuverability.

In an embodiment said wind turbine blade comprises at least one rudder detachably fastened to said wind turbine blade such that said wind power can be navigated. This also serves to improve the maneuverability of the blades.

In an embodiment said wind turbine blade comprises at least one fitting detachably fastened to said wind turbine blade for connecting at least one other wind turbine blade to said wind turbine blade such that the connected wind turbine blades can be transported jointly in water. This is advantageous as a plurality of blades can be transported over very long distances.

BRIEF DESCRIPTION OF THE DRAWINGS

In the following, preferred embodiments of the invention will be described referring to the figures, where.

DESCRIPTION OF EMBODIMENTS

Figure 1:
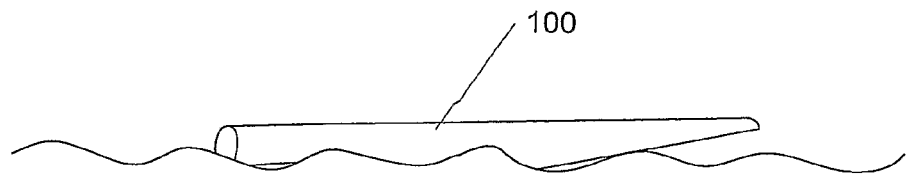
FIG. 1 illustrates a wind turbine blade floating in water.

FIG. 1 illustrates a wind turbine blade 100 floating in water. Modern blades are most often hollow, which means that they can float. Thus, modern blades are made of glass and/or carbon fibers and different core materials such as balsa tree, foamed materials, of which all materials are resistant to water. The net upward buoyancy force on the wind turbine blade is equal to the magnitude of the weight of fluid displaced by the wind turbine blade. This force enables the wind turbine blade to float.

Figure 2:
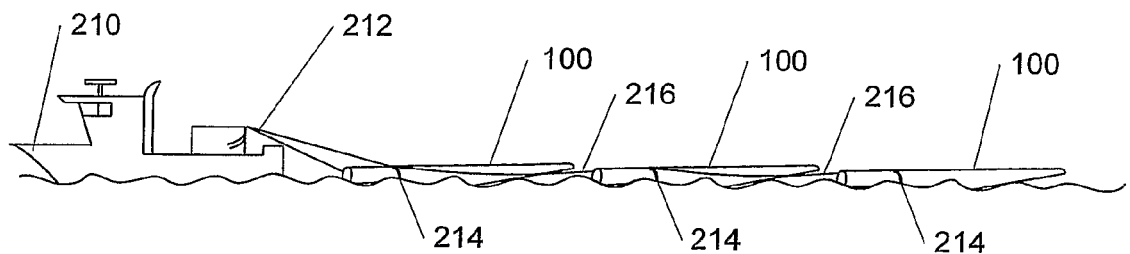
FIG. 2 illustrates a towboat towing a number of floating wind turbine blades arranged in a single file manner.

FIG. 2 illustrates a towboat 210 towing a number of floating wind turbine blades 100 arranged in a single file manner. Each wind turbine blade 100 is mounted with one or more fittings 214 used for connecting the wind turbine blades 100 together with a blade connection 216. The fitting 214 can e.g. be a belt or a clamp which is fastened to the blade 100 and can comprise e.g. one or more fastening means (not shown) such as rings for securing the blade connection 216, hawsers and towlines 212, etc. The fitting 214 can also be fixed in permanent fastening members (not shown) in the blade 100 or fastened directly in the blade 100 using e.g. screws (not shown), where after the holes from the screws could be closed. The blade connection 216 connects each of the wind turbine blades 100 to each other in e.g. the fittings 214 or in the blade root (not shown). The blade connection 216 can e.g. be a simple towline of hawser, in which the case the fittings 214 can be omitted and replaced by tying the blade connection 216 directly to the blade 100. The blade connection 214 can also be rigid such that a constant distance between each of the connected wind turbine blades 100 is kept. The blade connection 214 can have the shape of a bar or an arc, and be made of metal, glass fibre, rigid rope, etc. A constant distance between the wind turbine blades 100 is advantageous in order to ensure that the wind turbine blades 100 do not damage each other during the transportation Furthermore a rigid blade connection 214 ensures that the wind turbine blades 100 cannot move in a way not intended. The wind turbine blade 100 closest to the towboat 210 is connected thereto by the towline 212. This connection may also be rigid to ensure a safety distance between the towboat 210 and the wind turbine blade 100, and to obtain a sufficient maneuverability of both towboat 210 and the connected wind turbine blades 100. The wind turbine blades 100 can also be transported in reverse order, such that the blade tip would be in front. Regardless of how and with what means the wind turbine blades 100 are transported, the blades ability to float is exploited.

Figure 3:
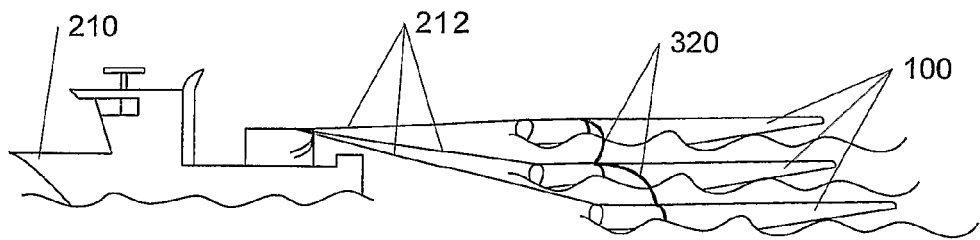
FIG. 3 illustrates a towboat towing a number of floating wind turbine blades arranged side-by-side.

FIG. 3 illustrates a towboat 210 towing a number of floating wind turbine blades 100 arranged side-by-side. Each wind turbine blade 100 is mounted with a fitting (not indicated) used for connecting the wind turbine blades 100 together with one or more blade connections 320. Each end of the blade connection 320 is connected to the fittings (not indicated) of neighboring wind turbine blades 100. Again the blade connection 216 can e.g. be a simple towline of hawser, in which case the fittings (not indicated) can be omitted and replaced by tying the blade connection 320 directly to the blade 100. To avoid that the blades 100 damage each other fenders (not shown) can be arranged between the blades 100. The blade connection 320 can also be rigid such that a constant distance between each of the connected wind turbine blades 100 is kept. Again, the constant distance between the wind turbine blades 100 is advantageous in order to ensure that the wind turbine blades 100 do not damage each other during the transportation. Furthermore the blade connection 320 ensures that the wind turbine blades 100 cannot move in ways not intended. The wind turbine blades 100 are rigidly connected to the towboat via the towline 212, fastened to the root sealing (not indicated) of the wind turbine blades 100. This towline 212 can likewise also rigid ensure a safety distance between the towboat 210 and the wind turbine blade 100, and to obtain a sufficient maneuverability of both towboat 210 and the connected wind turbine blades 100. For improving the maneuverability of the towboat 210 and the connected wind turbine blades 100, additional towlines 212 between the two could be added. The towline 212 can also be flexible like an ordinary towline or a hawser, and may be directly tied to the blade 100. The blade connections 320 can also be fastened to permanent fastening members (not shown) in the blade 100.

Figure 4:
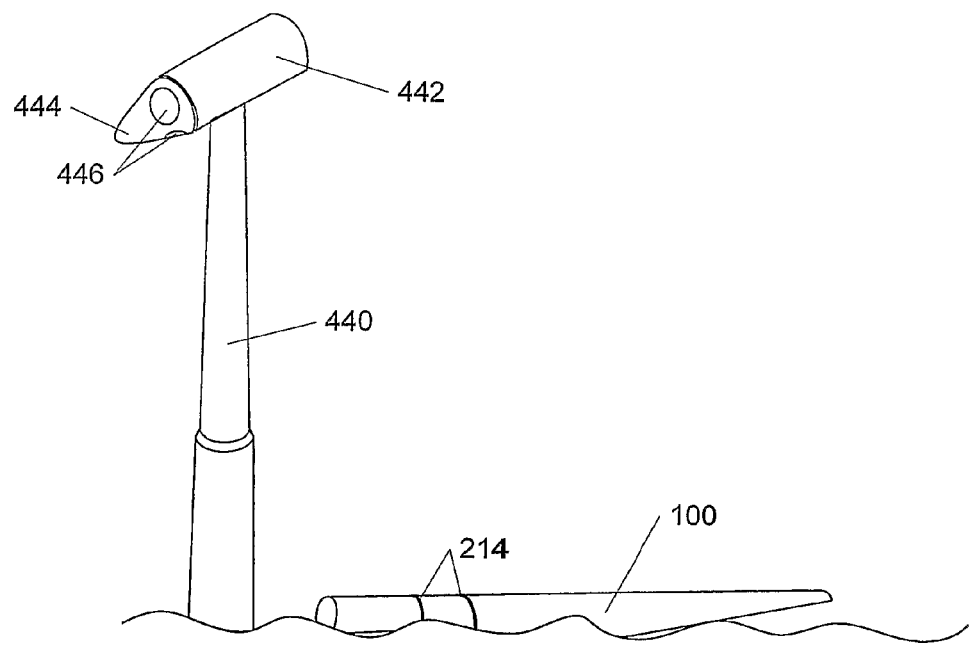
FIG. 4 illustrates the tower and nacelle of an offshore wind turbine with a floating wind turbine blade at its side.

FIG. 4 illustrates the tower 440 and nacelle 442 of an offshore wind turbine with a floating wind turbine blade 100 at its side. The wind turbine blade 100 may be lifted in e.g. the fittings 214, such that the blade root can be fastened to one of the wind turbine blade bearings 446 in the wind turbine nacelle 442. The fittings 214 are similar to the ones described above (see description of FIG. 2). The wind turbine blade 100 can be lifted by for example an offshore crane (not shown) located in the proximity of the wind turbine or by a helicopter. As the wind turbine blades are floating in the water and can be easily moved around the offshore crane can maintain its position during the whole installation of the wind turbine blades 100.

Figure 5:
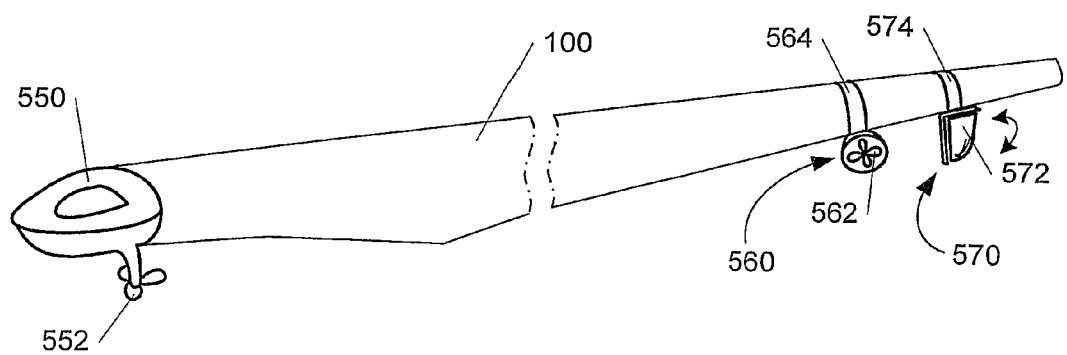
FIG. 5 illustrates a wind turbine blade adapted to be transported in water, wherein a propelling module has been fastened to the root, and side propeller and rudder fastened the blade tip.

FIG. 5 illustrates a wind turbine blade 100 adapted to be transported in water, wherein a propelling module 550 has been fastened to the root of the wind turbine blade 100, and side propeller 560 and rudder 570 fastened to the tip end of the blade 100. The propelling module 550 can be fastened to the blade root, and comprises a propeller 552, whereby the wind turbine blade 100 can be moved through the water. The propeller 552 can optionally be pivoted around an axis (not shown) perpendicular to the rotational axis of the propeller 552, whereby the floating wind turbine blade 100 can be moved in a desired direction. The propelling module 550 may be controlled remotely or be manned by a trained operator. The maneuverability of the wind turbine blade 100 can be further increased by mounting the blade 100 with a side propeller module 560 and/or a rudder module 570. The side propeller module 560 may comprise a fitting 564 used for mounting the side propeller module 560 on the wind turbine blade 100 and propeller 562. The propeller 562 can be pivoted around an axis (not shown) perpendicular to the rotational axis of the propeller 562. Hereby the wind turbine blade 100 can be maneuvered in a desired position, especially in narrow water as in harbors or at the installation location of an offshore wind turbine. The rudder module can 570 comprise a rudder 572 and a rudder fitting for mounting the rudder module 570 around the wind turbine blade 100. The rudder module increases the maneuverability of the wind turbine blade 100 in water, and can therefore the purposefully used in narrow water such as in harbors or at the installation location of an offshore wind turbine, and at open sea where a continuous adjustment of the rudder can compensate for current and weather conditions. Both the side propeller module 560 and the rudder module 570 can be detached after use, and need not be attached near the tip as shown in the figure, but can be arranged anywhere along the blade. The side propeller module 560 and the rudder module 570 do not necessarily have to be mounted on a wind turbine blade 500 fastened to a propelling module, but can be applied to a wind turbine blade towed by e.g. a towboat. Neither do is the side propeller module 560 and the rudder module 570 have to be mounted in combination, but can be used a single module as well. A wind turbine blade can also be mounted with a plurality of side propeller modules 560 and rudder modules 570. In another embodiment the propelling module 550, side propeller module 560, and the rudder module 570 can also be fixed directly in the blade 100 with e.g. screws (not shown). When the modules are no longer needed, the holes from screws can be closed. In a further embodiment the modules 550, 560, 570 could also be fixed to the blade 100 using permanent fastening members (not shown) in the blade 100.

Figure 6:
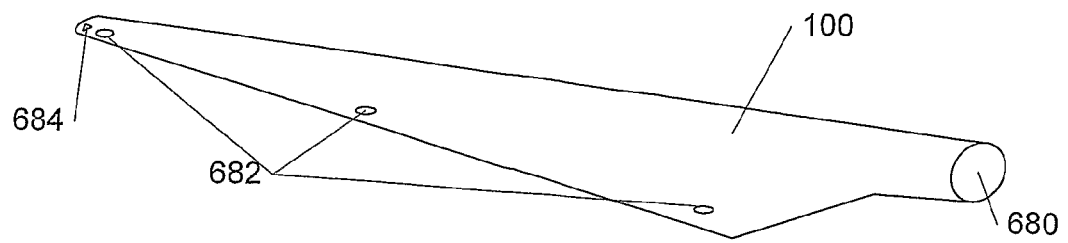
FIG. 6 illustrates a wind turbine blade with openings at the root end, drain holes and lightening conductor.

FIG. 6 illustrates a wind turbine blade 100 comprising the openings at the root end 680, drain holes 682, and lightening conductor 684. Prior to transporting the blade 100 these openings 680, 682 and the lightening conductor 684 can optionally be sealed or covered in a way that they openings and the lightening conductor can be at least partly restored. Thus the blade 100 could be arranged in a bag (not shown), or at least partly be wrapped with e.g. tape or another elastic and/or adhesive material (not shown). The openings 680, 682 and the lightening conductor 684 could also be padded with a material that could be optionally removed in order to restore these. Regardless of whether the seals or covers are applied, the blade 100 maintains its buoyancy. The drain holes 682 and the lightening conductor 684 can also be drilled and mounted, respectively, after the blade 100 has been transported to its end station, that is the installation location of the wind turbine (not shown). Depending on which direction the blade 100 is transported, the root opening 680 could be sealed using a plane plate or a have a shape suited for hydrodynamic conditions. Thus the root sealing could for example be shaped as a stem bulb. In another embodiment the blade 100 could at least partly be filled with water (not shown) in order to stabilize it when floating. In this way the inside of the blade would have a function resembling ballast water tanks in e.g. ships and vessels. To protect the inside of the blade this embodiment could also be realized by arranging a bag (not shown) inside the blade 100 and then at least partly fill this bag with water.

Figure 7:
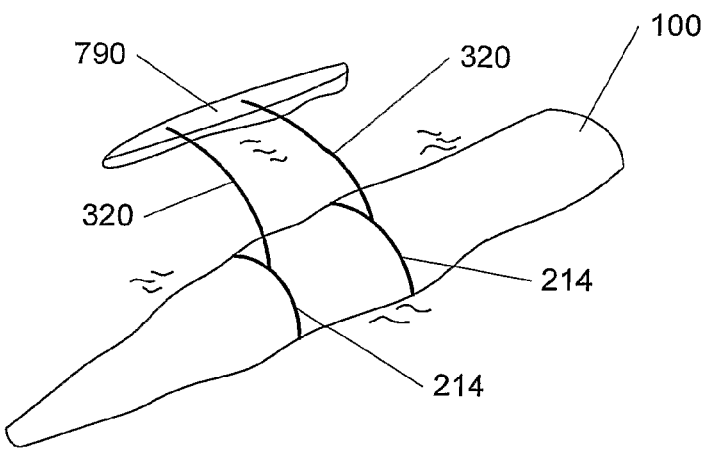
FIG. 7 illustrates a floating wind turbine blade mounted with a stabilizing unit.

FIG. 7 illustrates a floating wind turbine blade 100 mounted with a stabilizing unit 790. The stabilizing unit 790 is fastened to the blade 100 with a blade connection 320 similar to the ones described in FIG. 3. One end of the blade connection 320 is fastened to the fittings 214, which again are fastened to the blade 100. The other end of the blade connection 320 is fastened directly the stabilizing unit 790. The stabilizing unit 790 can be any element having buoyancy, such as a glass fibre structure. Furthermore the stabilizing unit 790 advantageously has a hydrodynamic shape suited for transportation is water. The stabilizing unit 790 stabilizes the transportation of the blade 100, and, among others, prevents the blade 100 from twisting in the water. The keel 830 could also be fastened directly in the blade 100, using e.g. screws (not shown). When the keel 830 is no longer needed the holes from the screws are closed.

Figure 8:
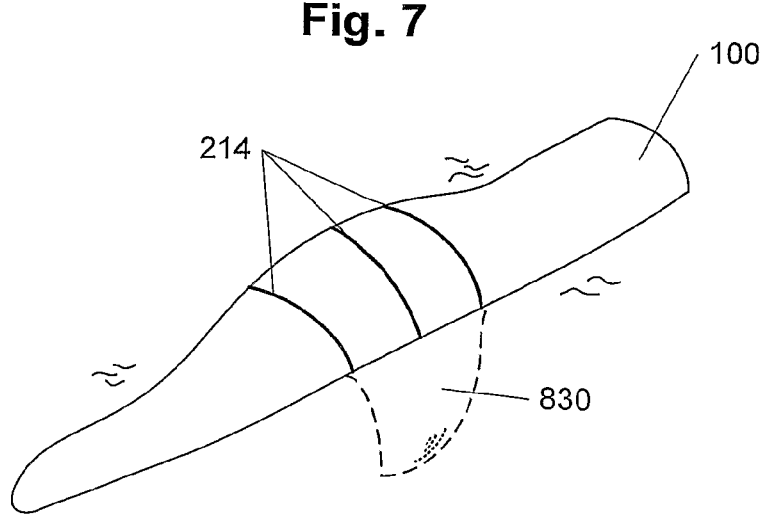
FIG. 8 illustrates a wind turbine blade adapted to be transported in water, on which a keel has been mounted.

FIG. 8 illustrates a wind turbine blade 100 adapted to be transported in water, on which blade a detachable keel 830 has been mounted. The keel 830 has been mounted to the blade 100 by fittings 214 fastened to the blade 100. The purpose of the keel 830 is to stabilize the transportation of the blade 100 in water, by among others preventing it from twisting in the water. The keel 830 can be removed prior to its installation, as the aerodynamic shape of the blades 100 is important for the efficiency of the wind turbine.

Figure 9:
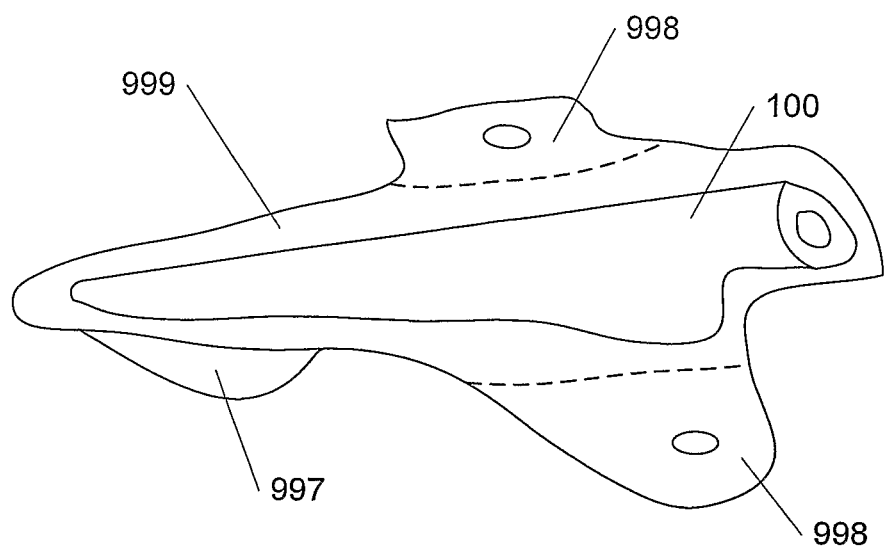
FIG. 9 illustrates a wind turbine blade arranged inside a sealed bag floating in water.

FIG. 9 illustrates a wind turbine blade 100 arranged inside a sealed bag 999 floating in water. The bag 999 is inflatable and comprises a keel 997 and compartments 998, where the keel 997 stabilizes the bag and the compartments 998 provide additional buoyancy. Both the keel 997 and compartments 998 can be optionally inflated. Instead of inflating the bag 999, a partly vacuum can also be established in the bag 999.

It should further be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim.

REFERENCES

100, wind power blade
210 towboat
212, towboat connection
214, fitting
216 blade connection
320 blade connection
440 wind turbine tower
442 wind turbine nacelle
444 wind turbine hub
446 wind turbine blade bearing
550 propelling module
552 propeller
560 side propeller module
562 propeller
564 side propeller fitting
570 rudder module
572 rudder
574 rudder module propeller
680 root opening
682 drain holes
684 lightening conductor
790 stabilizing unit
830 keel
997 keel
998 compartment
999 sealed bag

The invention claimed is:

1. A method for transporting at least one wind turbine blade, the wind turbine blade configured for mounting on a wind turbine, comprising the steps of:

lowering the at least one wind turbine blade into water, whereby the blade is rendered buoyant to float on water, and transporting the at least one wind turbine blade by towing the blade in the water, wherein the at least one wind turbine blade has at least one opening, and wherein the at least one opening has been sealed at least partly in a watertight way, such that the at least one wind turbine blade can be transported floating in water and where the at least one opening can be at least partly restored after transportation.

2. The method for transporting the at least one wind turbine blade according to claim 1, where the at least one wind turbine blade is towed by a vessel.

3. The method for transporting the at least one wind turbine blade according to claim 1, wherein the at least one wind turbine blade comprises a plurality of wind turbine blades being transported in water in single file behind a vessel.

4. The method for transporting the at least one wind turbine blade according to claim 1, wherein the at least one wind turbine blade comprises a plurality of wind turbine blades being transported in water side-by-side behind a vessel.

5. The method for transporting the at least one wind turbine blade according to claim 1, comprising fastening at least one stabilizing unit to the at least one wind turbine blade.

6. The method for transporting the at least one wind turbine blade according to claim 1, comprising fastening at least one propelling means to the at least one wind turbine blade.

7. The method for transporting the at least one wind turbine blade according to claim 1, comprising fastening at least one towing means to the at least one wind turbine blade.

8. The method for transporting the at least one wind turbine blade according to claim 1, comprising fastening at least one protecting unit to the at least one wind turbine blade.

9. The method for transporting the at least one wind turbine blade of claim 8, wherein said at least one protecting unit comprises a fender.

10. The method for transporting the at least one wind turbine blade of claim 1, wherein the at least one opening in the at least one wind turbine blade comprises an opening in the root end of the at least one wind turbine blade or one or more drain holes in the at least one wind turbine blade.

* * * * *